United States Patent
Hens et al.

(10) Patent No.: US 7,569,205 B1
(45) Date of Patent: Aug. 4, 2009

(54) NANODIAMOND FRACTIONAL AND THE PRODUCTS THEREOF

(75) Inventors: Suzanne Ani Ciftan Hens, Durham, NC (US); Scott L. Wallen, Chapel Hill, NC (US); Olga Alexander Shenderova, Raleigh, NC (US)

(73) Assignee: International Technology Center, Raleigh, NC (US)

( * ) Notice: Subject to any disclaimer, the term of this patent is extended or adjusted under 35 U.S.C. 154(b) by 34 days.

(21) Appl. No.: 11/899,885

(22) Filed: Sep. 7, 2007
(Under 37 CFR 1.47)

Related U.S. Application Data

(60) Provisional application No. 60/842,960, filed on Sep. 8, 2006.

(51) Int. Cl.
*B01J 3/06* (2006.01)
*D01F 9/12* (2006.01)
*C01F 17/00* (2006.01)
*C09G 1/02* (2006.01)
*B24D 3/02* (2006.01)

(52) U.S. Cl. .................... 423/446; 423/447.1; 423/263; 51/307; 51/308; 51/309; 106/3

(58) Field of Classification Search ............... None
See application file for complete search history.

(56) References Cited

U.S. PATENT DOCUMENTS

| 4,997,454 | A | 3/1991 | Violante et al. | |
|---|---|---|---|---|
| 6,447,694 | B1 | 9/2002 | Lee et al. | |
| 7,037,352 | B2 * | 5/2006 | Ito et al. | 51/307 |
| 2002/0129559 | A1 | 9/2002 | Ito et al. | |
| 2005/0178727 | A1 * | 8/2005 | Takagi et al. | 210/634 |
| 2006/0241236 | A1 | 10/2006 | Kuznetsov et al. | |

FOREIGN PATENT DOCUMENTS

| JP | 2005-320220 | * 11/2005 |
|---|---|---|
| WO | WO 2007/133765 A2 | * 11/2007 |

OTHER PUBLICATIONS

Sato et al.; Study on Dispersion and Surface Modification of Diamond Powders by Ultrasound Exposure; IEEEUltrasonic Symposium; 2002.*

Derwent Accession No. 2007-894395 relating to WO 2007/133765 A2.

(Continued)

*Primary Examiner*—Melvin C Mayes
*Assistant Examiner*—Guinever S Gregorio
(74) *Attorney, Agent, or Firm*—Miller Patent Services; Jerry A. Miller

(57) ABSTRACT

In certain embodiments, a method of processing detonation nanodiamonds to fractionate the detonation nanodiamonds involves, in order forming a combination of detonation nanodiamonds and a solvent, said solvent containing at least approximately 10% DMSO (v/v), applying a dispersive technique to said combination, subjecting said combination to a procedure that causes nanodiamond particles of a first size range to be substantially spatially separated from nanodiamonds of a second size range, and collecting said nanodiamonds of said first size range essentially free of said second size range. This abstract is not to be considered limiting, since other embodiments may deviate from the features described in this abstract.

17 Claims, 2 Drawing Sheets

OTHER PUBLICATIONS

"Deagglomeration and functionalisation of detonation diamond," Anke Krueger et al., Wiley InterScience, published Sep. 4, 2007.

"Effect of sodium oleate adsoption on the colloidal stability and zeta potential of detonation synthesized diamond particles in aqueous solutions," Xiangyang Yu et al, Science Direct, Diamond and Related Materials 14 (2005) p. 206-212, Jan. 8, 2004.

"Influence of surface modification adopting thermal treatments on dispersion of detonation nanodiamond," Xiangyang Yu et al, Science Direct, Journal of Solid State Chemistry 178 (2005), p. 688-693, Oct. 15, 2004.

"Nanodiamonds for Biological Investigations," V.S. Bondar et al., Physics of the Solid State, vol. 46, No. 4, p. 716-719, 2004.

"Disperse Strenghtening of Polymers—Theoretical Considerations and Experiments with UDDP," S. Stavrev et al., Nanoscience & Nanotechnology, eds. E. Balabanova, I. Dragieva, Heron Press, Sofia, 2001.

"Deaggregation of Ultra-Disperse Diamond Powders," J.S. Karadjov et al., Space Research Institute, Sep. 2006.

"Preparation and Behavior of Brownish, Clear Nanodiamond Colloids," Ozawa et al., Wiley InterScience, 2007.

"In Silico Approaches to Prediction of Aqueous and DMOS Solubility of Drug-Like Compounds: Trends, Problems and Solutions," Konstantin V. Balakin et al., Current Medicinal Chemistry, 13, p. 223-241, 2006.

"Nanodiamond and onion-like carbon polymer nanocomposites," O. Shenderova et al., ScienceDirect, Diamond and Related Materials 16, p. 1213-1217, 2007.

"Application-Specific Detonation Nanodiamond Particulate," O. Shenderova et al., Nanotech, 2006.

\* cited by examiner

NANODIAMOND FRACTIONAL AND THE PRODUCTS THEREOF

CROSS-REFERENCE TO RELATED APPLICATIONS

This application claims priority from U.S. Provisional Application No. 60/842,960 filed on 8 Sep. 2006 entitled "DMSO FORMULATIONS FOR NANODIAMONDS" which is hereby incorporated by reference.

STATEMENT REGARDING FEDERALLY SPONSORED RESEARCH OR DEVELOPMENT REFERENCE TO SEQUENCE LISTING, A TABLE, OR A COMPUTER PROGRAM LISTING COMPACT DISK APPENDIX:

This invention was made with government support under U.S. Army Research Laboratory under grant W911NF-04-2-0023.

BACKGROUND OF THE INVENTION

Nanodiamonds produced by detonation synthesis using carbon-containing explosives as the precursor material are valuable for diverse applications. While the primary particle size of these detonation nanodiamonds (DND) is 4-5 nm, during processes of synthesis and purification these particles become agglomerated and appear as aggregates when suspended in solvents. For example, DND aggregates in water are typically between 200 and 400 nm. In order to utilize DND for many applications, it is important to isolate smaller particles from larger aggregates. The current methods for size-fractionation of DND have drawbacks including being labor intensive. Some fractionation schemes require surface modification of the DND, which is sometimes undesirable.

DETAILED DESCRIPTION OF THE INVENTION

Figure 1:
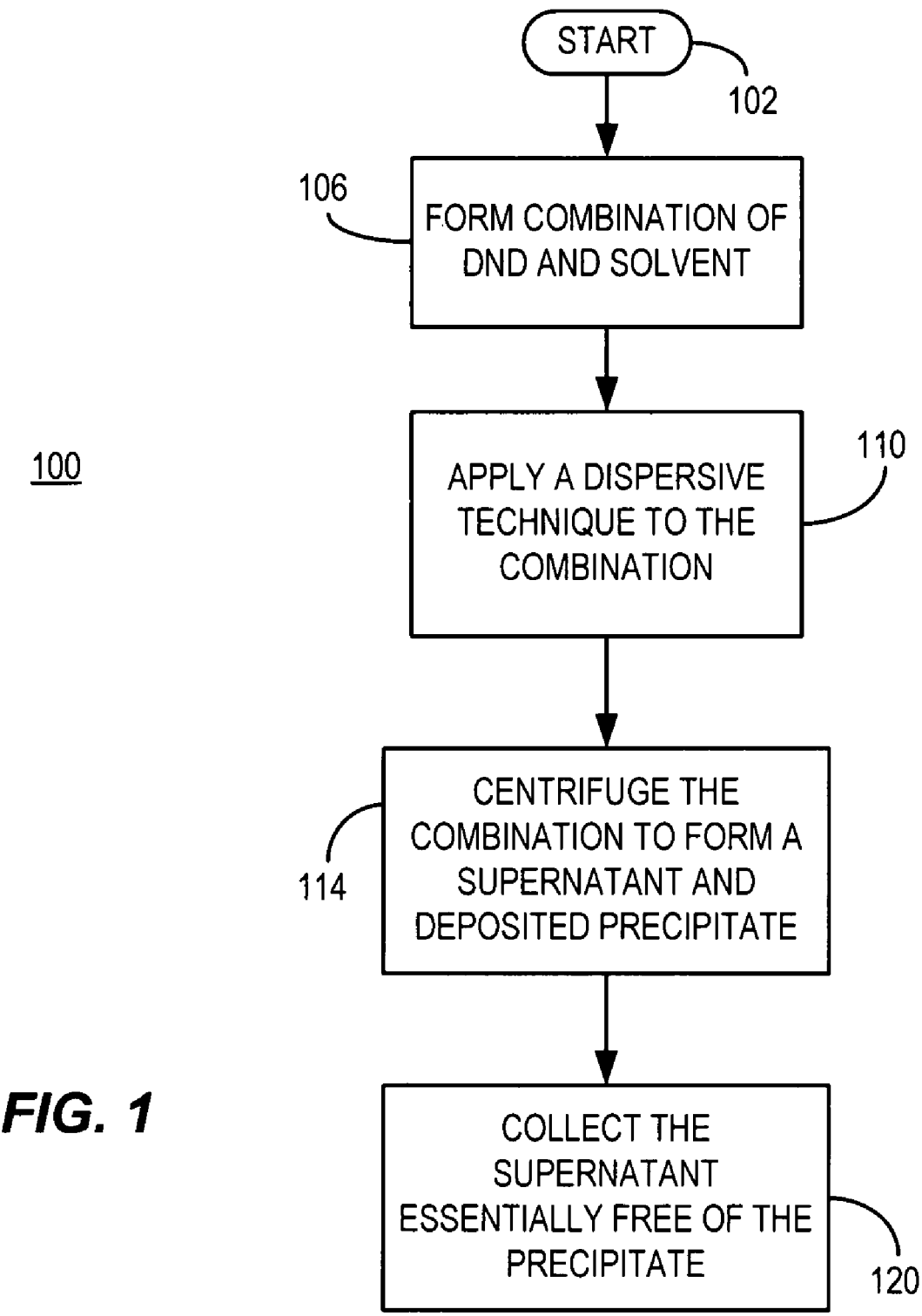
FIG. 1 is a flow chart of an Example of an exemplary method according to certain illustrative Examples.

"DMSO" as used here is dimethyl sulfoxide.

It should be noted that certain examples included in this disclosure represent embodiments of the invention. Certain examples are not embodiments of the invention, but are included for comparison to embodiments of the invention. A desired outcome of the experiments conducted was to identify a high yielding process with a small volume-averaged particle size in the suspension (e.g., less than about 50-125 nm).

DND Ch-St used in various Examples described below was produced by detonation using ice cooling media and purified using chromic anhydride in sulfuric acid. These DNDs have a wide range of particle sizes. The volume-averaged particle size in water is 250 nm and the volume-averaged particle size in DMSO is 215 nm.

DND 16 was produced by purification of DND Ch-St using ion exchange resins.

Method Example I: A mixture of 10% (w/v) DND Ch-St in DMSO was treated for two hours in a Retsch PM400 ball milling machine. The suspension was diluted with DMSO to a concentration of 7.5% (w/v) DND. The sample was then centrifuged at 25,000×g for 30 minutes. The supernatant was retained.

Dispersion Example I: This Example is the supernatant retained in Method Example I. In one such case, the dispersion contained 2.5% (w/v) DND with an average volumetric size of less than 40 nm.

Method Example II: A mixture of 15% (w/v) DND Ch-St in DMSO was treated in for two hours in a Retsch PM400 ball milling machine. The suspension was diluted with DMSO to a concentration of 9% (w/v) DND. The sample was then centrifuged at 25,000×g for 30 minutes. The supernatant was retained.

Dispersion Example II: This Example is the supernatant retained in Method Example II. In one such case, the dispersion contained 2.7% (w/v) DND with an average volumetric size of less than 50 nm.

Method Example III: A mixture of 1% (w/v) DND Ch-St is dispersed in DMSO by ultrasonic agitation (5 minutes, 10 watts). The sample was then centrifuged at 25,000×g for 30 minutes. The supernatant was retained.

Dispersion Example III: This Example is the supernatant retained in Method Example III. In one such case, the dispersion contained 0.22% (w/v) DND with a volume-averaged particle size of 40 nm.

Method Example IV: A mixture of 3% (w/v) DND Ch-St was dispersed in DMSO by ultrasonic agitation (5 minutes, 10 watts). The sample was then centrifuged at 25,000×g for 30 minutes. The supernatant was retained.

Dispersion Example IV: This Example is the supernatant retained in Method Example IV. In one such case, the dispersion contained 0.9% (w/v) DND with a volume-averaged size of 48 nm.

Method Example V: A mixture of 1% (w/v) DND Ch-St was dispersed in DMSO by ultrasonic agitation (5 minutes, 10 watts). The sample was then centrifuged at 25,000×g for 30 minutes. The supernatant was removed. The pellet was dispersed in DMSO by ultrasonic agitation (5 minutes, 10 watts). The sample was then centrifuged at 25,000×g for 30 minutes. The supernatant was retained.

Dispersion Example V: This Example is the supernatant retained in Method Example V. In one such case, the dispersion contained 0.18% (w/v) DND with a volume-averaged size of 41 nm.

Method Example VI: A mixture of 3% (w/v) DND Ch-St was dispersed in DMSO by ultrasonic agitation (5 minutes, 10 watts). The sample was then centrifuged at 25,000×g for 30 minutes. The supernatant was removed. The pellet was dispersed in DMSO by ultrasonic agitation (5 minutes, 10 watts). The sample was then centrifuged at 25,000×g for 30 minutes. The supernatant was retained.

Dispersion Example VI: This Example is the supernatant retained in Method Example VI. In one such case, the dispersion contained 0.55% (w/v) DND with a volume-averaged size of 50 nm.

Method Example VII: A mixture of 1% (w/v) DND 16 was dispersed in DMSO by ultrasonic agitation (5 minutes, 10 watts). The sample was then centrifuged at 25,000×g for 30 minutes. The supernatant was retained.

Dispersion Example VII: This Example is the supernatant retained in Method Example VII. In one such case, the dispersion contained 0.39% (w/v) DND with a volume-averaged size of 33 nm.

Method Example VIII: A mixture of 1% (w/v) DND 16 was dispersed in 50% (v/v) DMSO and 50% (v/v) water by ultrasonic agitation (5 minutes, 10 watts). The sample was then centrifuged at 25,000×g for 30 minutes. The supernatant was retained.

Dispersion Example VIII: This Example is the supernatant retained in Method Example VIII. In one such case, the dispersion contained 0.45% (w/v) DND with a volume-averaged size of 47 nm.

Method Example IX: A mixture of 1% (w/v) DND 16 was dispersed in 50% (v/v) DMSO and 50% (v/v) methanol by ultrasonic agitation (5 minutes, 10 watts). The sample was then centrifuged at 25,000×g for 30 minutes. The supernatant was retained.

Dispersion Example IX: This Example is the supernatant retained in Method Example IX. In one such case, the dispersion contained 0.2% (w/v) DND with a volume-averaged size of 36 nm.

Method Example X: A mixture of 1% (w/v) DND 16 was dispersed in 40% (v/v) DMSO and 60% (v/v) methanol by ultrasonic agitation (5 minutes, 10 watts). The sample was then centrifuged at 25,000×g for 30 minutes. The supernatant was retained.

Dispersion Example X: This Example is the supernatant retained in Method Example X. In one such case, the dispersion contained 0.11% (w/v) DND with a volume-averaged size of 65 nm.

Method Example XI: A mixture of 1% (w/v) DND 16 is dispersed in 30% (v/v) DMSO and 70% (v/v) methanol by ultrasonic agitation (5 minutes, 10 watts). The sample was then centrifuged at 25,000×g for 30 minutes. The supernatant was retained.

Dispersion Example XI: This Example is the supernatant retained in Method Example XI. In one such case, the dispersion contained 0.07% (w/v) DND with a volume-averaged size of 83 nm.

It should be noted that for each of the experimental examples in this disclosure, the specific results were for a particular batch of DND particles. Since DND are variable from batch to batch, the average size obtained after the method is performed would be expected to variable. It is likely, that each method Example disclosed here could yield average sizes approximately 50% higher or approximately 30% lower than the actual results disclosed. For one example, if another batch of DND particles was used, it would not be surprising if Method Example XI yielded a volume-averaged size of 125 nm.

Method Example XII: A mixture of 1% (w/v) DND 16 was dispersed in 50% (v/v) DMSO and 50% (v/v) water by ultrasonic agitation (5 minutes, 10 watts). The sample was then centrifuged at 25,000×g for 30 minutes. The supernatant was removed. The pellet was dispersed in 50% (v/v) DMSO and 50% (v/v) water by ultrasonic agitation (5 minutes, 10 watts). The sample was then centrifuged at 25,000×g for 30 minutes. The supernatant was retained.

Dispersion Example XII: This Example is the supernatant retained in Method Example XII. In one such case, the dispersion contained 0.23% (w/v) DND with a volume-averaged size of 56 nm.

Method Example XIII: A mixture of 1% (w/v) DND 16 was dispersed in 20% (v/v) DMSO and 80% (v/v) methanol by ultrasonic agitation (5 minutes, 10 watts). The sample was then centrifuged at 25,000×g for 25 minutes. The supernatant was retained.

Dispersion Example XIII: This Example is the supernatant retained in Method Example XIII. In one such case, the dispersion contained 0.07% (w/v) DND with a volume-averaged size of 75 nm.

Method Example XIV: A mixture of 1% (w/v) DND 16 was dispersed in 20% (v/v) DMSO and 80% (v/v) isopropanol by ultrasonic agitation (5 minutes, 10 watts). The sample was then centrifuged at 25,000×g for 25 minutes. The supernatant was retained.

Dispersion Example XIV: This Example is the supernatant retained in Method Example XIV. In one such case, the dispersion contained 0.6% (w/v) DND with a volume-averaged size of 80 nm.

Method Example XV: A mixture of 3% (w/v) DND 16 was dispersed in DMSO by ultrasonic agitation (5 minutes, 10 watts). The sample was then centrifuged at 25,000×g for 30 minutes. The supernatant was retained.

Dispersion Example XV: This Example is the supernatant retained in Method Example XV. In one such case, the dispersion contained 1.4% (w/v) DND with a volume-averaged size of 35 nm.

Method Example XVI: A mixture of 3% (w/v) DND 16 was dispersed in 10% (v/v) DMSO and 90% (v/v) de-ionized water by ultrasonic agitation (5 minutes, 10 watts). The sample was then centrifuged at 25,000×g for 30 minutes. The supernatant was retained.

Dispersion Example XVI: This Example is the supernatant retained in Method Example XVI. In one such case, the dispersion contained 0.7% (w/v) DND with a volume-averaged size of 40 nm.

It is specifically envisioned that a wide range of dispersive techniques could be used alternatively to ultrasonic agitation, ball milling or other physical or other dispersive techniques. Those methods would include, but not be limited to, shaking, movement in electrical fields, and exposure to electromagnetic radiation (for example, in the UV-VIS region).

It is specifically envisioned that other fractionation techniques compared to centrifugation could be used instead of centrifugation. Those methods could include, but are not be limited to flow electrophoresis, gravimetric sedimentation, solvent/antisolvent of supercritical fluids, and other methods known in the field.

It is specifically envisioned that Examples of the invention disclosed here could work on a wide range of DND types. However, while it may be possible for methods which are Examples of the invention disclosed here to fractionate other DND types, those with positive zeta-potentials seem to work best.

It is worth noting that in solvents containing DMSO and either isopropanol or methanol, adjustment of the portion of the solvent which is isopropanol or methanol varies the results of the fractionation. That adjustability can be useful to allow the results to be tailored for specific requirements.

A variety of solvents which disperse detonation nanodiamonds well, which not containing DMSO, were tried as alternatives. However, none performed as satisfactorily as those containing DMSO. The effect of DMSO seems to go beyond being a "good solvent." However, the underlying reasons for that effect are not clear. Generally speaking, smaller volume averaged particle size in the dispersion and (at higher yields) are considered to be most desirable.

Method Example XVII: A mixture of 10% (w/v) DND Ch-St in de-ionized water was treated for two hours in a Retsch PM400 ball milling machine. The suspension was diluted with de-ionized water to a concentration of 4% (w/v) DND. The sample was then centrifuged at 25,000×g for 30 minutes. The supernatant was retained.

Dispersion Example XVII: This Example is the supernatant retained in Method Example XVII. In one such case, the dispersion contained no nanodiamond particles detectable by eye. It was not possible to fractionate ball-milled Ch-St DND.

Method Example XVIII: A mixture of 1% (w/v) DND Ch-St is dispersed in de-ionized water by ultrasonic agitation (5 minutes, 10 watts). The sample was then centrifuged at 1,000×g for 5 minutes. The supernatant was retained.

Dispersion Example XVIII: This Example is the supernatant retained in Method Example XVIII. In one such case, the dispersion contained no nanodiamond particles detectable by eye. It was not possible to fractionate in de-ionized water Ch-St DND.

Method Example XIX: A mixture of 3% (w/v) DND 16 was dispersed in de-ionized water by ultrasonic agitation (5 minutes, 10 watts). The sample was then centrifuged at 25,000×g for 30 minutes. The supernatant was retained.

Dispersion Example XIX: This Example is the supernatant retained in Method Example XIX. In one such case, the dispersion contained 0.47% (w/v) DND with a volume-averaged size of 30 nm.

Method Example XX: A mixture of 1% (w/v) DND Ch-St was dispersed in pyridine by ultrasonic agitation in a sonic bath (15 minutes). The sample was then centrifuged at 13,000×g for 10 minutes. The supernatant was retained.

Dispersion Example XX: This Example is the supernatant retained in Method Example XX. In one such case, the dispersion contained no nanodiamond particles detectable by eye. It was not possible to fractionate in pyridine the Ch-St DND.

Method Example XXI: A mixture of 1% (w/v) DND Ch-St was dispersed in dimethylformamide by ultrasonic agitation in a sonic bath (15 minutes). The sample was then centrifuged at 25,000×g for 30 minutes. The supernatant was retained.

Dispersion Example XXI: This Example is the supernatant retained in Method Example XXI. In one such case, dispersion contained 0.07% (w/v) DND with a volume-averaged size of 42 nm.

Method Example XXII: A mixture of 1% (w/v) DND 16 was dispersed in Methanol by ultrasonic agitation (5 minutes, 10 watts). The sample was then centrifuged at 25,000×g for 25 minutes. The supernatant was retained.

Dispersion Example XXII: This Example is the supernatant retained in Method Example XXII. In one such case, the dispersion contained no nanodiamond particles detectable by eye. In one such case, it was not possible to fractionate DND 16 in Methanol.

Method Example XXIII: A mixture of 1% (w/v) DND 16 was dispersed in isopropanol by ultrasonic agitation (5 minutes, 10 watts). The sample was then centrifuged at 25,000×g for 25 minutes. The supernatant was retained.

Dispersion Example XXIII: This Example is the supernatant retained in Method Example XXIII. In one such case, the dispersion contained no nanodiamond particles detectable by eye. In one such case, it was not possible to fractionate DND 16 in isopropanol.

Thus, it was not possible to fractionate DND Ch-St in pure solvents such as water, isopropanol, methanol, or pyridine. It was possible to fractionate DND Ch-St in dimethylformamide but the yield of small size fractions was low. While DND 16 can be easily fractionated in water, the yield of the fraction of similar size in DMSO is several times higher at equal conditions of fractionation.

Thus, in certain Examples, as depicted in FIG. 1, a method depicted as 100 for fractionating denotation nanodiamond starts at 102 and involves in order forming a combination of denotation nanodiamonds and a solvent at 106 which contains at least approximately 10% (v/v) DMSO, applying a dispersive technique to the combination at 110, centrifuging the combination to form supernatant and deposited precipitate at 114, and collecting the supernatant essentially free of the deposited precipitate at 120.

Fractionated DND can be produced by any of the variations in the method as described above.

Surprisingly, removal of the solvent from the supernatant collected following fractionalization of DND in DMSO, subsequent solvent removal from the DND product, followed by re-dispersing this DND product in DMSO and other solvents did not result in agglomeration. Surprisingly, in a variety of solvents the particle size of the re-dispersed DND product was similar to the size in the initial fraction of DND in DMSO. In contrast typical DND products produced by drying a water suspension, followed by re-dispersion in water results in a particle size that is typically noticeably larger. DND in powder form is much easier and more economical to transport than suspensions and it allows for flexibility in formulating new suspensions. Below are illustrations of certain Examples of the method.

Method Example XXIV: The supernatant of 16 in pure DMSO retained in Method Example XV was dried by heating.

Material Example XXIV: This Example is the powder collected in Method Example XXIV. To determine properties of that material, the powder was re-suspended in DMSO by shaking. All of that powder was completely dispersed in DMSO. The volume-averaged particle size in the suspension after shaking was 60 nm. Then the suspension was sonicated. After sonication the volume-averaged particle size, 35 nm, became similar to that of the suspension before drying. In another experiment, a sample of Example XXIV was re-suspended in pure water and sonicated. After sonication the volume-averaged particle size in water became similar to that in the suspension before drying, 37 nm. In another experiment, a sample of Example XXIV was re-suspended in DMSO. Then sufficient methanol was added so that the solvent was 1:10 (v/v) DMSO:methanol. After sonication the volume-averaged particle size in the suspension was 50 nm.

Method Example XXV: the supernatant of 16 in de-ionized water retained in Method Example XIX was dried by heating.

Material Example XXV: This Example is the powder collected in Method Example XXV.

The powder collected in the material Example XXV was re-suspended in pure water by shaking and was then sonicated. The suspension had noticeable residue. The volume-averaged particle size in the suspension was 98 nm. This size is larger than the size of DND in the initial de-ionized water suspension before drying.

Method Example XXVI: The supernatant of 16 in 10% (v/v) DMSO and 90% (v/v) de-ionized water obtained in Method Example XVI was dried by heating.

Material Example XXVI: This Example is the powder collected in Method Example XXVI.

The powder collected in Material Example XXVI was re-dispersed in pure water by shaking and then sonicated. The suspension had some residue. The volume-averaged particle size in the suspension was 55 nm.

Method Example XXVII: The supernatant of 16 in de-ionized water obtained in Method Example XIX was mixed with equal amount of DMSO by volume. The suspension was shaken and dried by heating.

Material Example XXVII: This Example is the powder collected in Method Example XXVII.

The powder collected in material Example XXVII was re-suspended in water by shaking and then sonicated. The suspension had some residue. The volume-averaged particle size in the suspension was 48 nm.

When a DND fraction from a water suspension is dried to a powder form and then re-suspended in de-ionized water, the volume averaged agglomerate size might increase up to 100%. However, in certain Examples of the invention, drying fractionated DND from pure DMSO followed by reconstitution in DMSO, the reconstituted DND had approximately the same particle size. The same was true when those dried DND were reconstituted in some other solvents. In other Examples of the invention, drying DND from some solvents which are a mixture of DMSO and other solvents, the re-suspended DND particles have less than a 50% size increase.

The suspensions and powders of fractionated DND obtained by using DMSO are useful in a variety of applications, including but are not limited to suspensions for seeding of DND for growth of CVD diamond films; formulations of ND in DMSO for electronic processing methods, such as photoresist stripping, substrate polishing, substrate cleaning; formulations of DND in DMSO for paint removal and cleaning of substances; formulations of DND in DMSO for chemical mechanical polishing and other applications.

Certain Examples of the invention illustrating applications are provided below. In certain Examples of the invention addition of a second solvent to the suspension of DND fraction in pure DMSO following fractionation of DND in pure DMSO was found to be beneficial for some applications.

Method Example XXVIII: the supernatant of 16 in DMSO obtained in Method Example XV was mixed with methanol and additional DMSO so that the final solvent mixture was 1:1 (v/v) DMSO:methanol.

Suspension Example XXVIII: This Example is the suspension of 0.25% (w/v) DND obtained from Method Example XXVIII.

Figure 2:
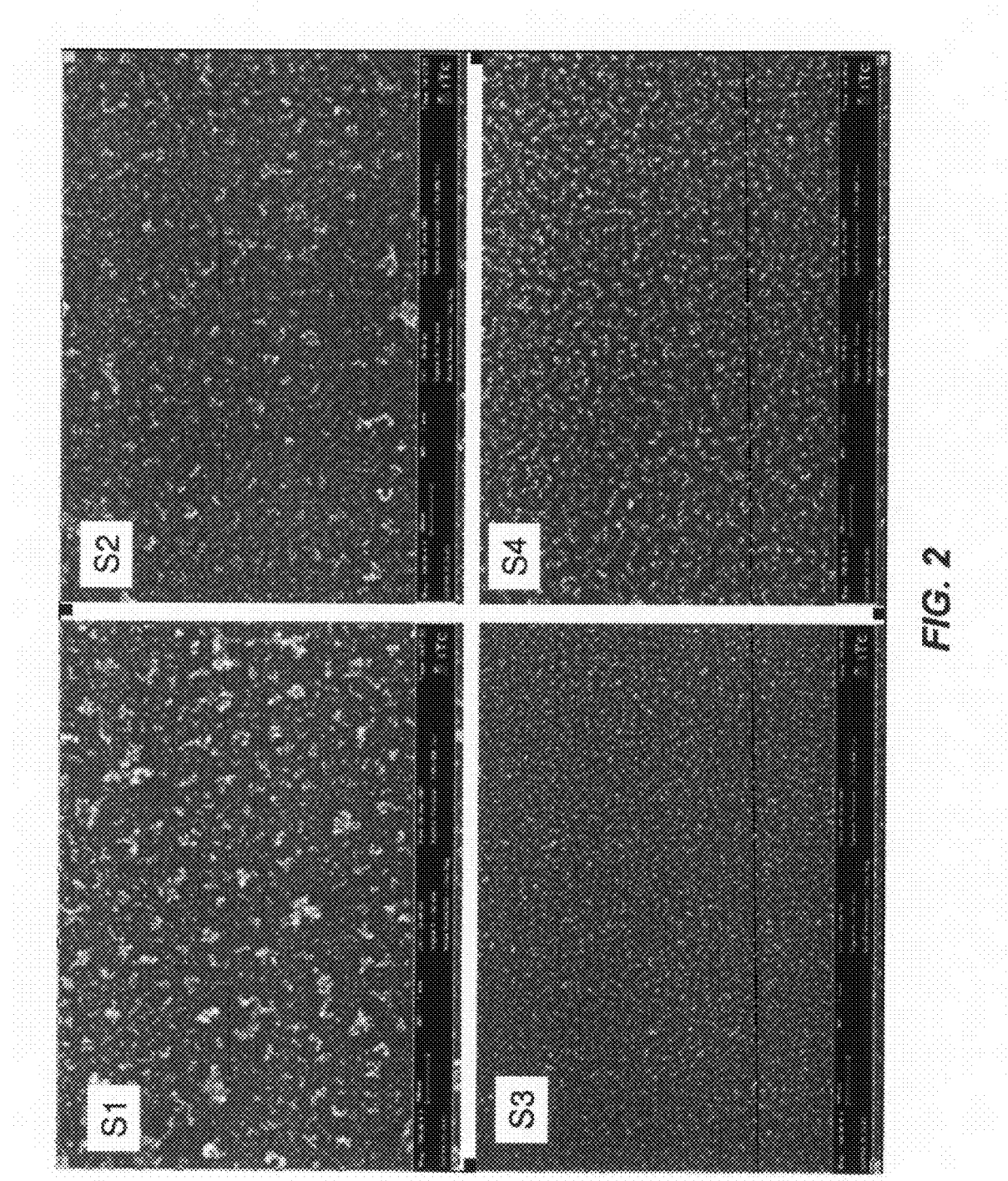
FIG. 2 is SEM images of the DND seeding on Si substrate performed using four DND suspensions: 0.25% (w/v) DND in pure DMSO (S1); 0.5% (w/v) DND in pure DMSO (S2); 0.25% (w/v) DND in the mixture of DMSO/methanol 50%-50% (v/v) from Suspension Example XXVIII. (S3); 0.2% (w/v) DND in the mixture of DMSO/methanol 50%-50% (v/v) from the Suspension Example IX. (S4).

Comparative seeding experiments were done for four DND suspensions: 0.25% (w/v) DND in DMSO obtained using dissolved suspension from the Suspension Example XV (S1); 0.5% (w/v) DND in pure DMSO obtained using dissolved suspension from the Suspension Example XV (S2); 0.25% (w/v) DND in the mixture of DMSO/methanol 50%-50% (v/v) obtained from the Suspension Example XXVIII. (S3); 0.2% (w/v) DND in the mixture of DMSO/methanol 50%-50% (v/v) from the Suspension Example IX. (S4). Silicone substrates were immersed in the suspensions S1-S4 and treated in a sonication bath within 10 minutes. After that the substrates were rinsed with methanol and nitrogen-dried. Results of the seeding are illustrated in FIG. 2. The best results (deposition of smaller sizes of DND aggregates on the substrate, better uniformity of the seeding and higher density of the seeds) are observed for the sample S3. In the other Examples of the invention experiments were performed for other substrates, such as stainless steel, titanium, tungsten, glass and quartz. Good quality seeding of DND over the substrates was obtained. In another Example of the invention, 0.12% (w/v) DND in the mixture of DMSO/methanol 25%-75% (v/v) was used for seeding on a Si substrate and good seeding results were obtained.

Thus in certain Examples of the invention adding a second solvent to the suspension of DND fractionated in DMSO results in a material Example that provided the best results for some applications.

Experiment 1

Separating differently sized particles using purified 16 ND was completed in a "bottom-up" approach starting at low speeds and ending at high centrifugation speeds, removing the largest particles while the remaining smaller fractions are left in the supernatant at the end of processing. To obtain the smallest fractions in a more rapid manner, a "top-down" approach may be used with an initial high centrifugation speed to collect the smallest particles in the supernatant. Initial work on this "top-down" approach showed that similar particle sizes were collected using water and DMSO suspensions for 16, while ethanol suspensions produced larger particle sizes. The small particle yield was lowest for ethanol and highest for DMSO. In addition, the small fraction yielded 5 nm particles, as observed by scanning electron microscopy, in this one-step fractionation approach.

The second set of experiments entailed a detailed analysis of the total yield of small particles as a function of ND material and solvent formulation. Below are the details of the processing steps for each sample with the accompanying data in Table I.

In order to rigorously test the capability of a suspension medium, the crude Ch-St is used for stability, yield, and particle size measurements. Water and DMSO suspensions produced very different results: A 1% Ch-St suspension in water produced large particles (250 nm) that rapidly sedimented, so that it was not possible to fractionated Ch-St in water, whereas small particles (50-65 nm) and stable suspensions were obtained for 1% Ch-St in DMSO by centrifugation the suspension with polydispersed powder for 30 minutes at 25,000 g see Table I. The yield of small particles from the Ch-St material will be compared to the yield of the same from the purified 16 product. The product loss in going from Ch-St to 16 was 50%. Thus, if this processing can be eliminated the product would be less expensive and time consuming to prepare. Interestingly, observation of the pellet formed from a highly concentrated solution, 5% Ch-St in DMSO, showed a rusty red color at its center, which we suspect is insoluble iron oxide. Treatment in DMSO can provide purification of Ch St from metallic impurities and large nanodiamond agglomerates.

TABLE I

Comparison of particle size and yield for different solvents and concentrations. $1^{st}$ round and 2d round correspond to centrifugation of the suspensions within 30 minutes at 25,000 g. For the 2d round, pellets obtained in the $1^{st}$ round were resuspended and centrifuged again.

| Solvent (initial concentration) % | ND | $1^{st}$ Round Size (unimodal [volumetric]) | Yield | $2^{nd}$ Round Size (unimodal [volumetric]) |
|---|---|---|---|---|
| DMSO 1% | 16 | 54 nm [33 nm] | 3.92 mg/mL (0.39%) | 65 nm [34 nm] |
| DMSO-H2O (50-50) 1% | 16 | 65 nm [47 nm] | 4.54 mg/mL (0.45%) | 80 nm [56 nm] |
| DMSO-Methanol (50-50) 1% | 16 | 50 nm [36 nm] | Lower (w.r.t 100% DMSO) | 51 nm [35 nm] |
| DMSO-Methanol (40-60) 1% | 16 | 65 nm | Low | |
| DMSO-Methanol (30-70) 1% | 16 | 83 nm | Very Low | |
| DMSO-Methanol (20-80) 1% | 16 | >>80 nm | Very low | |
| DMSO 1% | Ch-St | 61 nm [40 nm] | | 60 nm [41 nm] |
| DMSO 3% | Ch-St | 59 nm [48 nm] | | 59 nm [50 nm] |
| DMSO 5% | Ch-St | Stable† | | |
| DMSO 12% | Ch-St | Stable† | | |
| H2O 12% | Ch-St | DNW | | |
| DMSO-Methanol (50-50) 1% | Ch-St | DNW | | |
| H2O 1% | Ch-St | DNW | | |
| Acetone 1% | 16 | DNW | | |
| Methanol 1% | 16 | 183 nm | | |

TABLE I-continued

Comparison of particle size and yield for different solvents and concentrations. 1st round and 2d round correspond to centrifugation of the suspensions within 30 minutes at 25,000 g. For the 2d round, pellets obtained in the 1st round were resuspended and centrifuged again.

| Solvent (initial concentration) % | ND | 1st Round Size (unimodal [volumetric]) | Yield | 2nd Round Size (unimodal [volumetric]) |
|---|---|---|---|---|
| DMSO-Acetone (50-50) 1% | 16 | [280 nm] DNW | | |

DNW (did not work): all the ND condensed into the pellet leaving no ND in the supernatant
†Fractionation of these solutions was not attempted and may not be possible (for 25,000 g) because of their high viscosity.

After the first round of centrifugation, the pellet was dispersed again in the solvent and fractionation was repeated (second round). Based on the visual size of the pellets after centrifugation of 16 in water and DMSO at the same initial concentrations, it was concluded that DMSO provides higher yields of the smallest particles (with approximately the same particle size after centrifugation under the same-conditions). Another advantage of using DMSO for fractionation of Ch 16 is that higher initial concentrations can be obtained in DMSO. We tried concentrations up to 10% which resulted in ~2% concentration in the supernatant, a high concentration. As can be seen from the table, processing in mixtures of DMSO with several other solvents resulted in suspensions with small particle sizes.

From the above description and drawings, it will be understood by those of ordinary skill in the art that the particular Examples shown and described are for purpose of illustration only, and are not intended to limit the scope of the invention. Those of ordinary skill in the art will recognize that the invention may be embodied in other specific forms without departing from its spirit or essential characteristics. References to details of particular Examples are not intended to limit the scope of the claims.

Thus, in certain embodiments, a method of processing detonation nanodiamonds to fractionate the detonation nanodiamonds involves, in order forming a combination of detonation nanodiamonds and a solvent, the solvent containing at least approximately 10% DMSO (v/v), applying a dispersive technique, such as a physical or chemical dispersive technique, to the combination, subjecting the combination to a procedure that causes nanodiamond particles of a first size range to be substantially spatially separated from nanodiamonds of a second size range, and collecting the nanodiamonds of the first size range essentially free of the second size range. In certain embodiments, the solvent contains at least approximately 30% (v/v) DMSO. In certain embodiments, the solvent contains at least approximately 50% (v/v) DMSO. In certain embodiments, the solvent is essentially DMSO. In certain embodiments, the physical dispersive technique comprises ball milling. In certain embodiments, an additional solvent or mixture of solvents is added to the dispersion collected following fractionation. In certain embodiments, the method further involves deposition of nanodiamond particles of the first size range on a solid substrate, the deposition following the collecting of the nanodiamonds of the first size range essentially free of the second size range. In certain embodiments, the detonation nanodiamonds have a positive zeta-potential. In certain embodiments, the method further involves removing the solvent from the collected nanodiamond particles of the first size range to produce a detonation nanodiamond product. In certain embodiments, the method further involves deposition of nanodiamond particles of the first size range on a solid substrate, the deposition following the collecting of the nanodiamonds of the first size range essentially free of the second size range. In certain embodiments, the method further involves removing the solvent from the collected nanodiamond particles of the first size range. Products consistent with certain embodiments may include detonation nanodiamonds and DND products processed by any of these methods.

In certain embodiment, a suspension of detonation nanodiamonds is produced in a solvent in which the solvent contains at least approximately 25% (v/v) DMSO and the volume-averaged size of less than approximately 125 nm.

In certain embodiments, a method for processing detonation nanodiamonds involves forming a combination of detonation nanodiamonds and a first solvent, applying a dispersive technique to the combination, subjecting the combination to a procedure that causes nanodiamond particles of a first size range to be substantially spatially separated from nanodiamonds of a second size range, collecting a suspension of the nanodiamonds of the first size range essentially free of the second size range, and adding DMSO to the collected suspension of the nanodiamonds of the first size range. In certain embodiments, the first solvent is selected from the group consisting essentially of water, methanol and isopropanol. In certain embodiments the method further involves removing the solvent from the collected suspension of nanodiamonds of the first size range to produce a detonation nanodiamond product.

No claim element herein is to be construed under the provisions of 35 U.S.C. § 112, sixth paragraph, unless the element is expressly recited using the phrase "means for" or "step for." The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one Example", "certain Examples", "an Example" or similar terms means that a particular feature, structure, or characteristic described in connection with the Example is included in at least one Example of the present invention. Thus, the appearances of such phrases or in various places throughout this specification are not necessarily all referring to the same Example. Furthermore, the particular features, structures, or characteristics may be combined in any suitable manner in one or more Examples without limitation. The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

What is claimed is:

1. A method of processing detonation nanodiamonds to fractionate the detonation nanodiamonds comprising, in order:
    providing detonation nanodiamonds,
    forming a combination consisting essentially of said detonation nanodiamonds and a solvent,
    said nanodiamonds exhibiting a positive zeta potential in said solvent,
    said solvent consisting essentially of DMSO making up at least approximately 10% DMSO (v/v) in the solvent with any balance of the solvent consisting essentially of a polar solvent, wherein the DMSO increases or stabilizes the magnitude of the positive zeta potential of the detonation nanodiamonds in the combination, applying a dispersive technique to said combination, subjecting said combination to a procedure that causes nanodiamond particles of a first size range to be substantially spatially separated from nanodiamonds of a second size range, and collecting said nanodiamonds of said first size range essentially free of said second size range.

2. A method for processing detonation nanodiamonds as in claim 1, wherein said solvent contains approximately 20% (v/v) DMSO.

3. A method for processing detonation nanodiamonds as in claim 1, wherein said solvent contains approximately 10-30% (v/v) DMSO.

4. A method for processing detonation nanodiamonds as in claim 3, wherein said solvent is essentially DMSO, and said solvent stabilizing or increasing the nanodiamond zeta potential as compared to the zeta potential of the detonation nanodiamonds in water.

5. A method for processing detonation nanodiamonds as in claim 1, wherein said physical dispersive technique comprises ball milling.

6. A method for processing detonation nanodiamonds as in claim 4, wherein an additional solvent or mixture of solvents is added to the dispersion collected following fractionation.

7. A method for processing detonation nanodiamonds as in claim 1, further comprising deposition of nanodiamond particles of said first size range on a solid substrate wherein the nanodiamond particles remain affixed to said substrate, said deposition following the collecting of said nanodiamonds of said first size range essentially free of said second size range.

8. A method for processing detonation nanodiamonds as in claim 1, further comprising removing the solvent from the collected nanodiamond particles of said first size range to produce a detonation nanodiamond product.

9. A method for processing detonation nanodiamonds as in claim 6, further comprising deposition of nanodiamond particles of said first size range on a solid substrate wherein the nanodiamond particles remain affixed to said substrate, said deposition following the collecting of said nanodiamonds of said first size range essentially free of said second size range.

10. A method for processing detonation nanodiamonds as in claim 4, further comprising removing the solvent from the collected nanodiamond particles of said first size range.

11. A method for processing detonation nanodiamonds as in claim 8, further comprising combining a polar solvent with the detonation nanodiamond product.

12. A stable suspension of detonation nanodiamonds having a positive zeta potential in a solvent that consists essentially of at least approximately 10% (v/v) DMSO with any balance of the solvent being a polar solvent and the volume-averaged size of the detonation nanodiamonds is less than approximately 125 nm, wherein the presence of DMSO in the solvent substantially stabilizes or increases the magnitude of the positive zeta potential of the detonation nanodiamonds.

13. A method for processing detonation nanodiamonds, comprising forming a combination of detonation nanodiamonds and a first solvent, applying a dispersive technique to said combination, subjecting said combination to a procedure that causes nanodiamond particles of a first size range to be substantially spatially separated from nanodiamonds of a second size range, collecting a suspension of said nanodiamonds of said first size range essentially free of said second size range, and adding DMSO to said collected suspension of said nanodiamonds of said first size range wherein said nanodiamonds exhibit a positive zeta potential to prevent agglomeration of the nanodiamonds during removal of the solvent from the collected suspension, and removing the solvent from said collected suspension of nanodiamonds of said first size range to produce a detonation nanodiamond product.

14. A method as in claim 13, wherein said first solvent is selected from the group consisting essentially of water, methanol and isopropanol.

15. A method as in claim 13, further comprising combining a solvent with the detonation nanodiamond product.

16. A method for processing detonation nanodiamonds as in claim 13, further comprising combining a polar solvent with the detonation nanodiamond product.

17. A method as in claim 13, wherein said collected suspension contains at least approximately 10% (v/v) DMSO.

* * * * *

UNITED STATES PATENT AND TRADEMARK OFFICE
CERTIFICATE OF CORRECTION

PATENT NO.         : 7,569,205 B1
APPLICATION NO. : 11/899885
DATED              : August 4, 2009
INVENTOR(S)        : Hens et al.

It is certified that error appears in the above-identified patent and that said Letters Patent is hereby corrected as shown below:

On title page and at the top of Column 1, delete "NANODIAMOND FRACTIONAL AND THE PRODUCTS THEREOF" and insert -- NANODIAMOND FRACTIONIZATION AND THE PRODUCTS THEREOF" -- therefor.

On the title page, under inventors, delete "Scott L. Wallen, Chapel Hill, NC (US)".

Signed and Sealed this

Twenty-ninth Day of September, 2009

David J. Kappos
*Director of the United States Patent and Trademark Office*